Figure 1:
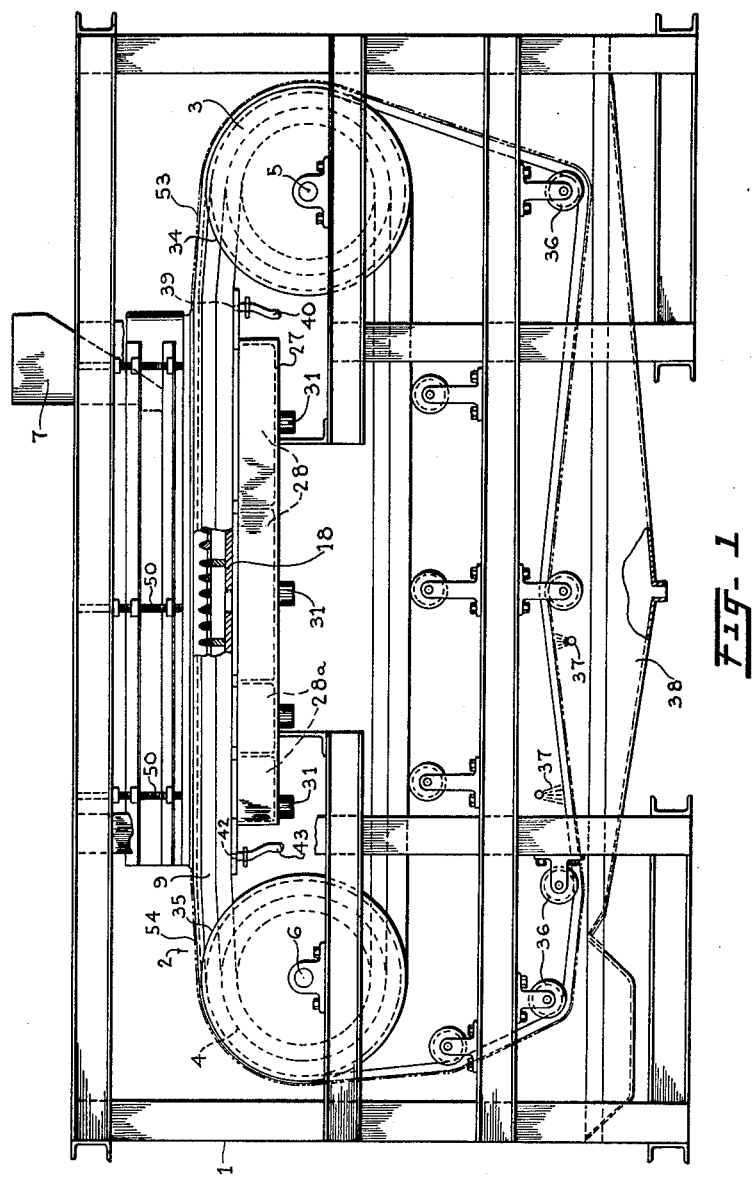

June 22, 1965

A. A. HOLLAND 3,190,451

ENDLESS BELT FILTER

Filed Sept. 4, 1962

2 Sheets-Sheet 1

INVENTOR
Arthur A. Holland
BY
Harold G. Weir
PATENT AGENT

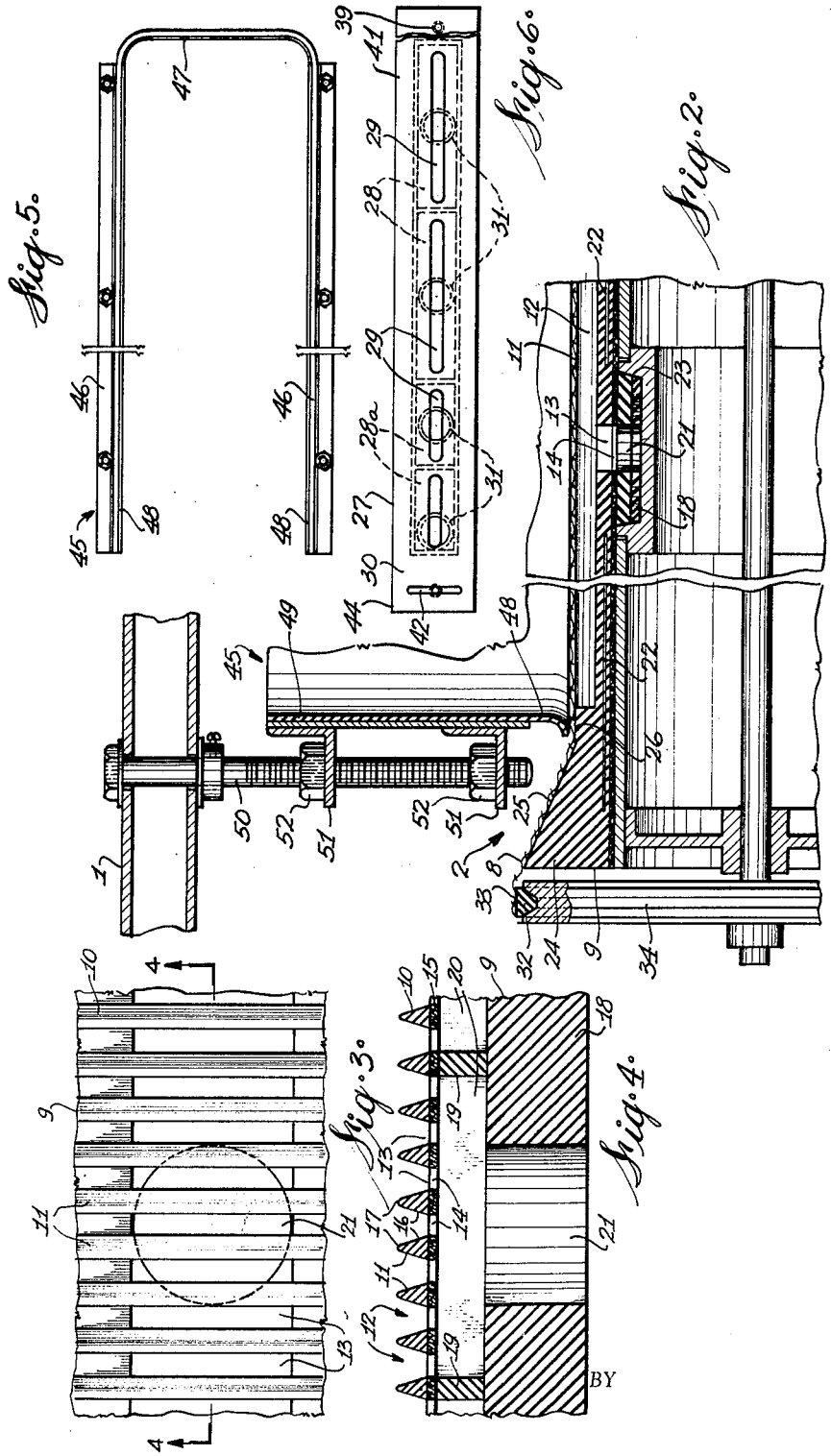

3,190,451
ENDLESS BELT FILTER
Arthur A. Holland, 1705 N. 12th Ave., Pensacola, Fla.
Filed Sept. 4, 1962, Ser. No. 221,295
2 Claims. (Cl. 210—251)

This invention relates to filters of the endless belt type. This application is a continuation-in-part of application, Serial Number 17,025, filed March 23, 1960, and now abandoned.

Filters of this type usually include the use of an endless filter medium, which may comprise a foraminous wire of metal, cloth, plastic composition or the like, an endless drainage belt which may include a gridlike structure, an endless traction belt for supporting and driving the filtering and drainage assembly, and an endless valve seat belt through which suction is imparted from a suction box to the filter medium and drainage areas of the drainage belt.

Attempts have been made to reduce the number of separate endless members, as set forth above, for various reasons. For instance, the fabrication of a plurality of separate endless members is costly. The mounting and installation of such separate members is complicated, and difficulty is frequently encountered in maintaining them in alignment and in proper mutual relation to each other. Nevertheless, because of the functions to be performed, it is difficult to combine the various belts. For instance, a collection space for filtrate draining from the drainage belt must be provided and this usually necessitates the provision of a separate belt.

It is an object of this invention to provide a substantially unitary endless filter belt assembly which is compact and simple in structure and which is effective in performing the steps of draining the filtrate, collecting the drained filtrate, and finally discharging the filtrate.

Another object is to provide, in a filter structure having such a belt assembly, a filter cake retaining and forming box in particular association with the belt assembly.

Another object is to provide a filter structure having an endless belt assembly and a suction box associated therewith in such manner that a more effective separation of filtrate from filter cake is rendered possible and whereby the structure is subject to convenient and troublefree operation.

Other objects, details, and advantages of the invention will appear from the following description of one embodiment of the invention as illustrated in the accompanying drawings, in which FIGURE 1 is a side elevation, partly in section, of a filter machine in accordance with the invention, FIGURE 2 is a partial sectional end view, in enlarged detail of the machine, FIGURE 3 is a partial plan view of an endless belt employed in the filter machine of the invention, FIGURE 4 is a section on line 4—4 of FIGURE 3, FIGURE 5 is a plan view of a slurry retaining means and cake-forming box, FIGURE 6 is a plan view of the suction box of the present invention.

In the drawings, 1 is a main frame and 2 an endless filter assembly supported on end drums 3 and 4 rotatably mounted in the frame by means of shafts 5 and 6. Drum 3 represents the feed end of the machine and drum 4 the discharge end. Drum 4 may be driven in any suitable manner (not shown). A feed hopper 7 is provided to deliver slurry to be filtered onto the upper travelling portion of the filter assembly adjacent the feed end thereof.

The filter assembly comprises an endless filter medium 8 which may be formed in conventional manner of a foraminous wire of metal, cloth, plastic composition or the like, and an endless belt 9.

Belt 9 is of single form. By "single" is meant a belt of unitary or one-piece nature or one fabricated from two or more pieces cemented or otherwise secured together into a single unitary member. The belt includes a top section 10 which is provided with a plurality of uniformly spaced transversely extending ribs 11 forming a plurality of filtrate receiving transverse grooves 12. Each groove is provided with at least one drainage aperture 13 disposed centrally of the groove and communicating with registering apertures or holes 14 in an intermediate section 15 of the belt. As shown, the walls 16 of each rib 11 converge upwardly towards an apex 17 upon which the filter medium rests. The filtrate is thus effectively directed in the grooves 12. Each aperture 13 and 14 is preferably in the form of an elongated slot.

The belt has a seat section 18 having formed therein as by walls or partitions 19, in conjunction with section 15, a plurality of longitudinally aligned elongated filtrate collecting basins or chambers 20 into each of which drains a series of the apertures 13 and 14. Section 18 also has a plurality of holes 21 therein each communicating with one of the basins 20 and constituting the discharge outlet thereof. It will be observed that the partitions 19 are of minor thickness whereby the overall length of chambers 20 occupy much the major circumferential extent of the belt. Thus, the cumulative circumferential extent of the chambers may be at least 90% of the entire circumferential extent of the belt.

The belt 9 may be formed of any suitable flexible material such as rubber, plastic composition, rubber and fabric, or the like. As shown, the sections 10 and 18 may be formed of rubber and the section 15 of fabric or fabric-reinforced rubber. Referring to FIGURE 2, section 10 is shown as reinforced with a fabric or cord 22 of suitable material such as that known under the trade mark "Nylon." It is important that, in the fabrication of the belt, such cords 22 terminate inwardly of the edges of apertures 13 so that the cords do not interfere with the formation of the apertures or with smooth edge surfaces thereof.

Belt section 18 is substantially narrower than sections 10 and 15 and is disposed substantially midway between the edges thereof. Each drum 3 and 4 is recessed at 23 to receive the section 18. Belt section 10 has longitudinal edge portions 24 of thickened wedge shaped cross-section to provide inclined surfaces 25 extending downwardly towards the grooves 12. Belt section 10 has a narrow longitudinally and continuously extending flat surface 26 adjoining the base of each surface 25 and at which the grooves 12 terminate. It will be apparent that such portions 24 will act to upturn the edge portions of the filter medium during its upper travel to retain thereon the slurry deposited thereon. It will, of course, be further apparent that, during the upper portion of travelling movement of the filter medium 8, it is arranged to overlie and engage the edges of the ribs 11.

A suction box 27 is mounted in the frame under the upper travelling portion of the filter assembly and comprises, in the example illustrated, a plurality of longitudinally aligned compartments 28 and 28a each having a longitudinal slot 29 in the top wall 30 thereof for communication with the holes 21 as the latter move therealong and each having a discharge outlet 31 for connection to a source of vacuum.

The suction imposed on the filter medium and its consequent engagement with ribs 11 will result in simultaneous travelling movement thereof with the belt 9. Means are provided for maintaining the filter medium in alignment and in proper relation to belt 9 and comprises bands or belts 32, which may be of any suitable type, such as of V type, as shown, to which is secured, as by tacks, staples, cement, adhesive or the like, the marginal sections 33 of the filter medium which extend beyond the edges of the belt 9. Belts 32 are mounted on a pair of free-running pulleys 34 at the feed end of the machine and mounted on shaft 5 and on a pair of free-running pulleys 35 at the discharge end which may be mounted on shaft 6. The pulleys 34 and 35 are preferably of slightly greater diameter than that of drums 3 and 4, plus the thickness of belt sections 10 and 15. Thus, when not under vacuum the filter medium will not ordinarily move with the belt.

The lower portion of travel of the filter medium and belt 32 is guided by means of a plurality of free-running pulleys 36 mounted in the frame. It will be observed that the pulleys 36 guide the filter medium in a path spaced below the lower path of travel of the belt 9 whereby it may be subjected on both sides to cleaning sprays 37, the wash water from which may be collected in a pan 38.

Means may be provided for lubricating the filter assembly as it travels over the suction box. To this end, an opening 39 connected by a line 40 to a source of water under low pressure is provided in a fixed plate 41 extending rearwardly from suction box 27 and in engagement with the under surface of belt section 16. This flow of water not only lubricates the contacting surfaces of belt section 16 and the suction box but also acts to provide a liquid seal between the surfaces.

Means may also be provided for freeing or loosening the filter cake from the filter medium just prior to its arrival at the discharge end. Such means comprises a transverse slot 42 connected by a line 43 to a source of air under pressure, and located in a fixed plate 44 extending forwardly from suction box 27 and in engagement with the under surface of belt section 16. Opening 42 communicates successively with holes 21 in belt 9. As a result, a jet of air of short duration emerges from each aperture 13 immediately following its movement over the suction box 27. It will be apparent that such successive jets will impose pressure on the under surface of the filter cake to loosen it from the filter medium.

Referring to FIGURES 2 and 5, a cake-forming box 45 comprises a U-shaped wall structure, open at top and bottom, and having side walls 46 and an end wall 47 disposed at the feed end of the machine. Each side wall 46 has a depending flexible skirt or lip 48 which may comprise the lower edge portion of liner sheet 49 of flexible material such as rubber or the like. The box is adjustably suspended from the frame by screw-threaded rods 50 which carry the box by means of brackets 51 and nuts 52. It will be apparent that the box is subject to vertical adjustment by adjusting the position of the nuts and brackets with respect to the box. Each lip 48 is arranged, as shown, in FIGURE 2 to flex outwardly whereby an edge portion bears upon the filter medium directly above the flat surface 26 of the belt. This continuous flat surface 26 is thus quite important in that, in association with the flexible, it provides effective sealing means for retention of the slurry on the filter cloth.

As clearly shown in FIGURE 1, it is preferable that the top surface of the suction box 27 be disposed in a plane slightly above the normal horizontal path of travel of the belt from one drum to the other whereby a slight rise is imparted to the belt at the feed end, as indicated at 53, and a slight fall, indicated at 54, is imparted to it at the discharge end. This feature ensures a snug and effective contact of the belt with the top surface of the box throughout its extent.

The unitary top wall 30 of the suction box constitutes an effective supporting means for the filter assembly during its upper path of travel. In the modification shown, two compartments 28 adjacent the feed end are of greater length than the two compartments 28a adjacent the discharge end. The use of a compartmentized suction box, with a separate suction connection to each compartment, makes it possible to vary and control the suction applied to the filter cake as it progresses from the feed to the discharge end of the assembly. The use of shorter compartments adjacent the discharge end makes it possible to more accurately control the degree of suction in this area. It will be apparent that no break in vacuum should occur as the filter belt assembly travels over the suction box from one compartment to another. Thus, the diameter of each hole or aperture 21 must be substantially greater than the thickness of the partition walls 31 defining the compartments.

It is believed that the operation of the filter will be apparent from the foregoing description. The filter cake is discharged from the filter medium as it passes over the drum 4 and is collected in any conventional manner.

I claim:

1. A filter machine comprising a frame, a pair of end drums mounted in said frame, one of said drums defining the feed end of said machine and the other of said drums defining the discharge end of said machine, an endless belt mounted on said drums and having an upper horizontal path of travel between said drums, said belt being of one-piece form and having a top surface, a bottom surface, a multiplicity of transversely extending grooves in said top surface, said grooves being in uniformly spaced order throughout the circumference of said belt and each said groove extending throughout the major portion of the width of said belt but terminating inwardly of each edge of said belt, ribs defining said grooves and each having converging side walls terminating in an apex, said top surface having continuous, flat, uninterrupted edge portions substantially coplanar with said apexes, each said groove having a bottom wall and an aperture therein disposed substantially midway between the ends thereof, a continuous section of less width than the overall width of said belt on said bottom surface, and a plurality of filtrate-collecting chambers each communicating with a plurality of said apertures, said section constituting the bottom wall of said chambers, walls extending substantially perpendicularly from said section and separating said chambers from each other, said chambers being arranged in uniformly spaced order about the circumference of said belt and having a cumulative circumferential extent at least 90% that of said belt, said section being arranged substantially midway between the edges of said belt and having a single discharge opening leading from each of said chambers to the external surface thereof, each said drum having an annular recess receiving said belt section, an endless filter medium seated on said rib apexes and in engagement with the entire area of said top surface edge portions, a suction box mounted in said frame and having a top surface engaging and supporting said belt during said upper path of travel, said discharge openings being in communication with said box during said upper path of travel, and a cake-forming box adjustably suspended from said frame and surmounting said belt in said upper horizontal path of travel, said box having a pair of side walls and a rear wall joining said side walls, each said side wall having a flexible skirt surmounting and aligned with one of said top surface edge portions, said skirt having a flexed portion engaging said filter medium to press said filter medium against said top surface edge portion, and means for adjusting the position of said box in a perpendicular direction with respect to said filter medium.

2. A filter machine as defined in claim 1, said suction box having a plurality of compartments therein arranged in successive order between said drums, a unitary top wall closing said suction box, each said compartment having in said top wall a separate longitudinally extending slot like aperture of less width than the diameter of said discharge openings communicating with said discharge openings and a separate vacuum source connection.

References Cited by the Examiner

UNITED STATES PATENTS

| 2,034,784 | 3/36 | Wallny | 210—401 |
| 2,314,294 | 3/43 | Wallny | 210—401 |
| 2,873,028 | 2/59 | Bried | 210—401 |

FOREIGN PATENTS 570,501   7/45   Great Britain.

REUBEN FRIEDMAN, *Primary Examiner.*

GEORGE D. MITCHELL, HERBERT L. MARTIN,
*Examiners.*